May 9, 1950 R. C. DEHMEL 2,506,998
FLIGHT NAVIGATION TRAINING APPARATUS
Filed Oct. 25, 1945 2 Sheets-Sheet 2
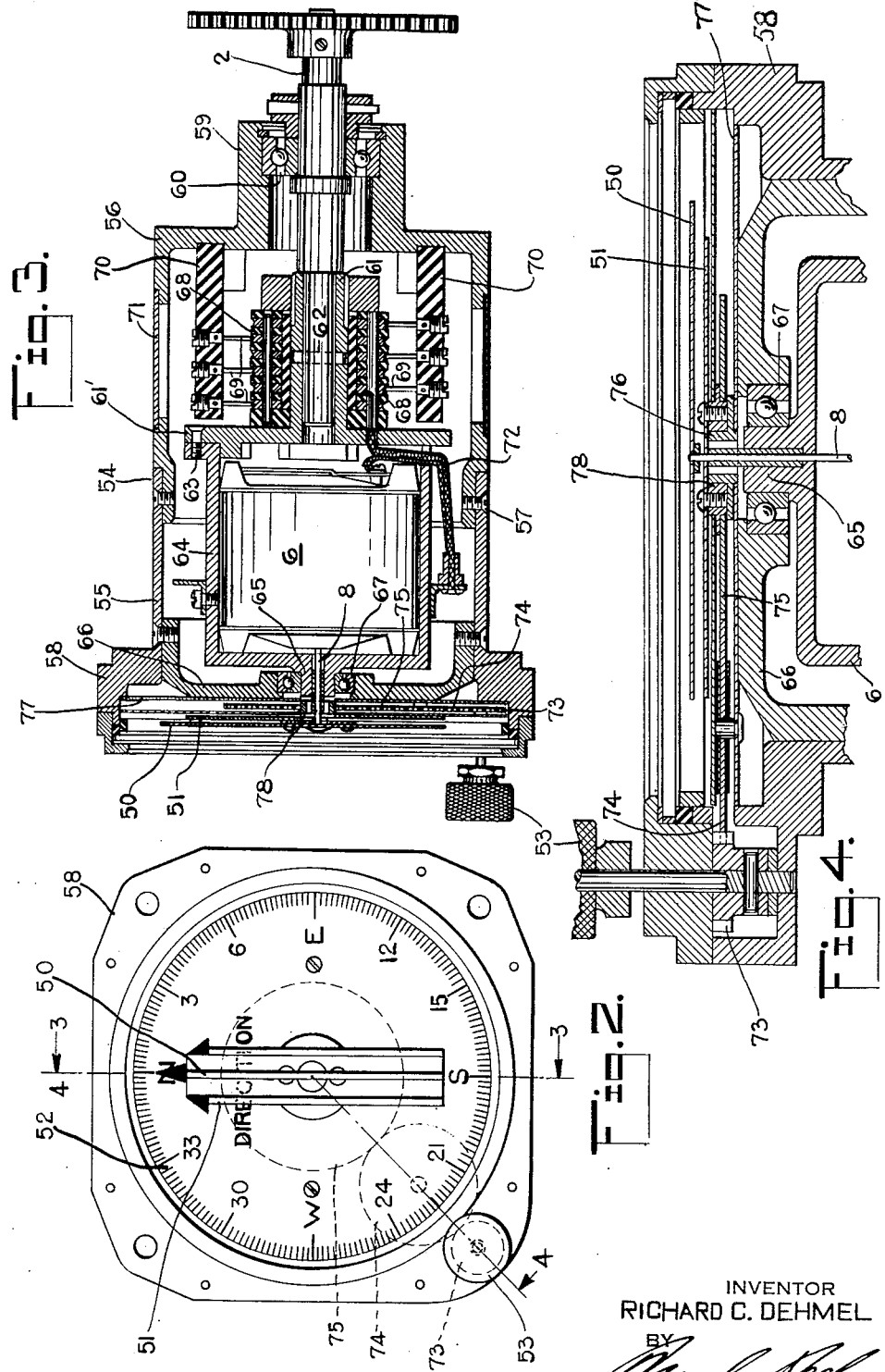
INVENTOR
RICHARD C. DEHMEL Patented May 9, 1950

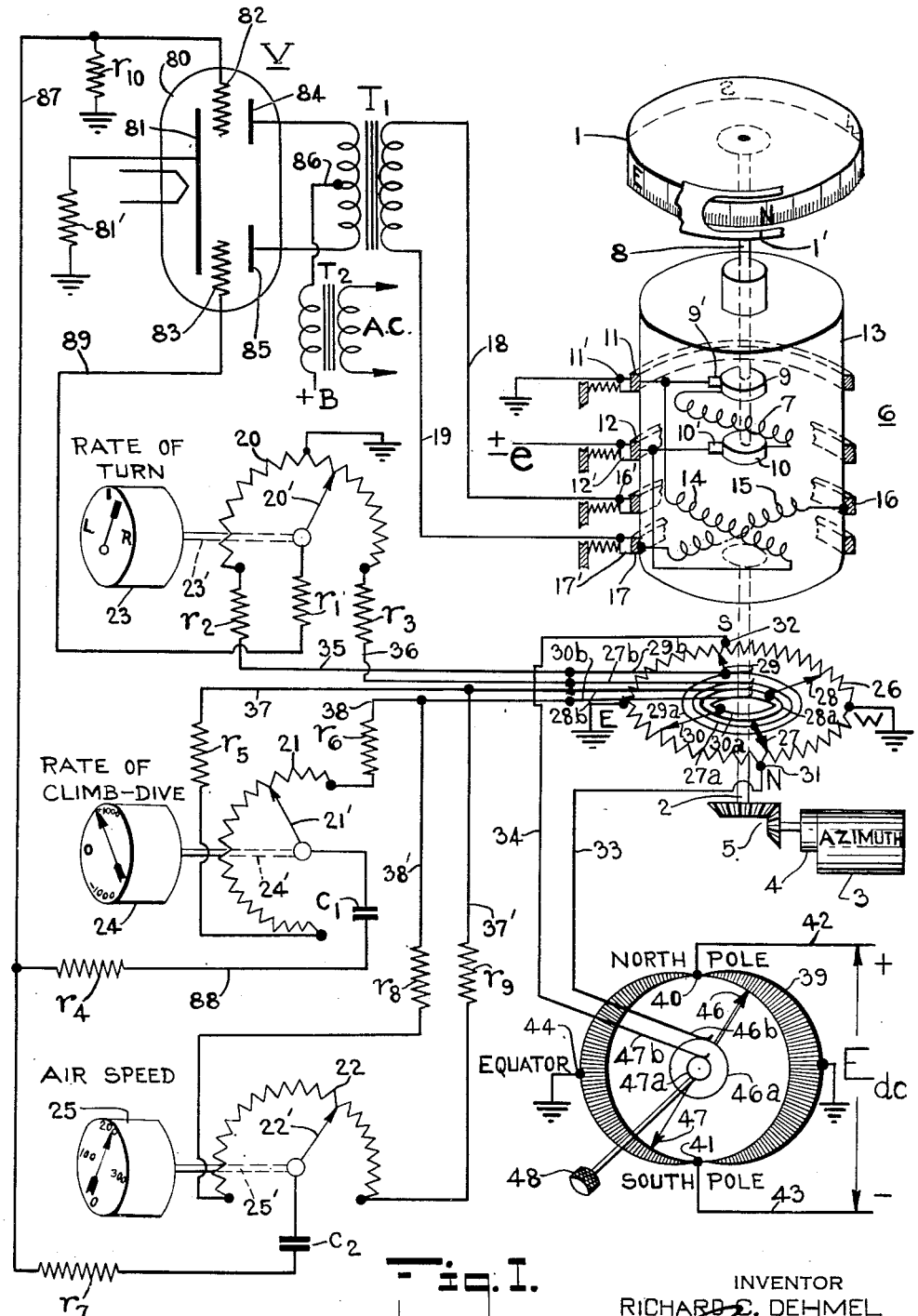

2,506,998

UNITED STATES PATENT OFFICE 2,506,998

FLIGHT NAVIGATION TRAINING APPARATUS

Richard C. Dehmel, Short Hills, N. J.

Application October 25, 1945, Serial No. 624,442

14 Claims. (Cl. 35—10.2)

This invention relates to flight navigation training apparatus, and particularly to compass apparatus for ground trainers that is operable in accordance with simulated flight maneuvers for realistically introducing in the compass readings turning and acceleration errors, such as "northerly turning error," encountered in actual flight.

An object of this invention is to provide improved compass apparatus for ground trainers that is capable of simulating in a realistic manner turning and acceleration errors as they would occur on different compass courses during aircraft maneuvers in actual flight.

A further object of this invention is to provide for ground trainers improved compass apparatus having a compass element responsive to change in compass heading of the simulated flight and also responsive to a gradually applied modifying or displacing force variable in magnitude and direction and having a predetermined relationship to the heading and change in flight direction of the aircraft in space for simulating turning and acceleration errors encountered in actual flight maneuvers.

A further object of this invention is to provide improved compass apparatus of the aforesaid type that is capable of simulating turning and acceleration errors such as would occur during aircraft maneuvers over a wide range of latitude including the Northern and Southern Hemispheres.

The invention will be more fully set forth in the following description referring to the accompanying drawings, and the features of novelty will be pointed out with particularity in the claims annexed to and forming a part of this specification.

Referring to the drawings:

Fig. 1 illustrates schematically simulated compass apparatus for flight trainers embodying the present invention;

Fig. 2 is a front elevational view of a simulated form of compass to which my invention may be applied;

Fig. 3 is an elevational sectional view taken along the line 3—3 of Fig. 2; and

Fig. 4 is an enlarged sectional view of apparatus shown in Fig. 3.

In actual flight certain compass errors called turning and acceleration errors may be encountered when making maneuvers such as turns, dives or climbs. These errors cause the compass to indicate falsely, such as for example, the direction of turn in the opposite sense, and in the other cases to indicate incorrectly right or left bearings. Since the nature of these errors is well known in the art of flight navigation, it is sufficient for the purpose of this specification to state that they are caused primarily by tilting of the magnet system by the vertical component of the earth's magnetic field so that the center of gravity of the system is offset with respect to a vertical line passing through the seating point of the magnet. Accordingly during turns, for example, there may be a couple due to the centrifugal force acting on the center of gravity tending to rotate the system and further to increase the amount of tilt. When the tilt is about the north-south axis of the compass card, the north seeking point of the compass tends to rotate toward the low side of the card.

Assuming that an aircraft is flying on a northerly course in the Northern Hemisphere, the effect of turning from this course to the east, for example, is to cause the magnet system to turn in the same direction as the aircraft. In the case of a steep turn, the compass will indicate a turn in the wrong direction which is technically known as "northerly turning error." In the case of more moderate turns the compass element will lag indicating a turn smaller than that actually made. If the aircraft is flying on a southerly course and makes a turn from south to west, for example, it will be seen that westerly deviation results. That is, the magnet system and the aircraft now turn in opposite directions so that the compass registers a turn in the correct sense but greater than that actually made. Hence the magnet system may be considered as leading in this case. When the aircraft is on easterly or westerly courses there is no turning error.

The acceleration errors occur mainly during climbs and dives and as contrasted with turning errors are greatest when the aircraft is flying an easterly or westerly course and do not occur when flying northerly or southerly courses. Acceleration on a westerly course, for example, causes counterclockwise deviation, while deceleration causes deviation in the opposite direction.

In the Southern Hemisphere the effects described occuring on northerly courses occur instead on southerly courses, and vice versa; also acceleration errors on easterly and westerly courses are in opposite directions to those above indicated. It will be understood, of course, that turning and acceleration errors occur in varying degrees on other courses, although maximum turning error occurs on a course of due north; and maximum acceleration error occurs when flying due east or due west and is zero when flying due north and due south.

The compass apparatus of this invention for simulating turning and acceleration errors above referred to is shown schematically by Fig. 1 wherein a compass element or card 1 is operatively connected to a shaft 2 so as generally to be positioned thereby in accordance with simulated change in the compass heading of the trainer. The shaft 2 is shown, for example, connected to an azimuth motor 3 which may be controlled by the operation of simulated flight controls in the manner described in my Patent 2,366,603. The azimuth motor is connected through reduction gearing 4 and gearing 5 to the shaft 2 so as to orient the shaft and the compass card 1 in accordance with the simulated change in direction of the flight.

The compass element and the shaft 2 are interconnected or coupled by an electro-responsive torque balancing device 6, which normally transmits the turning movement of the shaft to the compass element and which is also adapted under certain conditions to modify the movement of the compass element with respect to the shaft 2 so as to simulate errors above described. The electro-responsive device 6 may conveniently be a synchronous rotary transformer of the type known to the trade as "telegon" wherein relatively movable coil structures subject to different potentials are adapted to assume relative positions wherein the reacting forces are balanced. One coil structure or winding 7 is mounted on a rotatable shaft 8 which is secured to the compass card 1. The terminals of the coil 7 are connected to the shaft slip rings 9 and 10 which are in turn electrically connected through brushes 9' and 10' to the slip rings 11 and 12 respectively on the rotatable unit casing 13.

A pair of coils 14 and 15 are positioned in fixed quadrature relation in the casing 13 and are disposed so as to be in reacting relation to the coil 7. The terminals of the coil 14 are connected to the slip rings 11 and 12 respectively so that this coil is in shunt relation to coil 7, and the terminals of coil 15 are connected to the slip rings 16 and 17 respectively. The slip rings 11 and 12 are connected through brushes 11' and 12' to a circuit including a source of A. C. potential, ± $e$, and the slip rings 16 and 17 are connected through the brushes 16' and 17' to circuits having means for impressing varying "disturbing" potentials on the coil 15. In view of the fact that the casing 13 including the coils 14 and 15 is directly connected to the shaft 2 so as to rotate therewith, it will be seen that under normal conditions the reacting fields of the shunt connected coils 7 and 14 tend to hold the shafts 2 and 8 in alignment; and that disturbing potentials impressed on the coil 15 tend to vary the relative positioning of the aforesaid shafts, and hence modify the movement of the compass card 1.

As previously stated, the windings 7 and 14 are energized by the same potential ± $e$ so that they are maintained in orientation with respect to each other, and therefore with respect to the shaft 2, unless this alignment is disturbed by a voltage on a cross-phase winding 15. Such a disturbing or unbalancing voltage on coil 15 can cause the compass card 1 to deflect in either direction from its alignment with the shaft 2. The compass card 1 is read of course with reference to the "lubber line" 1' comprising a part of the fixed instrument panel.

For the purpose of energizing the coil 15 by a disturbing potential varying in accordance with certain flight conditions so as to cause the compass card 1 to simulate the above described compass errors, the brushes 16' and 17' which are electrically connected to the terminals of coil 15 are operatively connected by conductors 18 and 19 to electronic valve means V hereinafter described that is in turn controlled by various flight potentiometers 20, 21 and 22, respectively. Each potentiometer slider contact is operatively connected in any suitable manner, as through a torque amplifier (not shown), to a device responsive to a simulated flight condition, the contact 20' being connected as indicated at 23' to a rate-of-turn indicator 23, the contact 21' being connected as indicated at 24' to a rate-of-climb dive indicator 24 and the contact 22' being connected as indicated at 25' to an air speed indicator 25. These indicators may be controlled by the operation of simulated flight controls in the manner described in my above identified patent.

The potentials impressed across the terminals of the flight potentiometers 20, 21 and 22 are varied in accordance with the simulated flight compass heading, and to this end a potentiometer 26 positioned in fixed concentric relation to the shaft 2 is provided with four equally spaced sliding contacts 27, 28, 29 and 30 which are oriented with respect to the four principal compass positions of the azimuth potentiometer. These contacts are connected to a slip ring assembly mounted on the shaft 2 so as to rotate therewith and assume the simulated compass heading position of the shaft. Specifically, the slider contacts 27, 28, 29 and 30 are connected to slip rings 27a, 28a, 29a and 30a which make contact with the brushes 27b, 28b, 29b and 30b, respectively. Terminals 31 and 32 of the potentiometers are 180° apart and are fixed with reference to the lubber line 1' so as to represent the north and south reference positions respectively. These terminals are connected by conductors 33 and 34 to a source of D. C. potential, which may if desired also be variable as hereinafter described to represent variation in compass error with change in latitude, such as for example, a change in flight position toward the Equator or from the Northern to the Southern Hemisphere. It will be understood of course that this feature is optional and that the potentiometer terminals 31 and 32 may be energized by a constant direct current potential of proper polarity. The other quadrant terminals representing east and west are grounded as indicated. The flight and azimuth potentiometers above referred to may be contoured in a manner well known in the art to give any desired response function.

The terminals of the rate-of-turn potentiometer 20 are connected by conductors 35 and 36 including proportioning resistances $r_2$ and $r_3$ to the brushes 29b and 27b respectively of the azimuth potentiometer 26, the terminals of the rate-of-climb potentiometer 21 are connected by conductors 37 and 38 including resistances $r_5$ and $r_6$ to the brushes 28b and 30b respectively, and the air speed potentiometer 22 is connected by conductors 37' and 38' including resistances $r_9$ and $r_8$ in parallel with potentiometer 21 in the manner shown.

It is therefore apparent that the maximum potential for causing a maximum simulated compass error, is impressed on the rate-of-turn potentiometer 20 when the azimuth slider contacts 27 and 29 are in due north and south positions, and that there will be a minimum or zero potential on this potentiometer when contacts 27 and 29 are in due east and west positions; and that the maximum potential is impressed across the potentiometers 21 and 22 which are used to derive acceleration when the azimuth slider contacts 28 and 30 are in alignment with the terminals 31 and 32, indicating an east-west course; and that this potential is zero on a north-south course. It will also be seen that the polarity is reversed with reference to the D. C. source when the flight compass heading is reversed, such as a turn through 180° so that the turning errors that occur in actual practice may be simulated in accordance with the angular position of the shaft 2.

For example in the position shown the flight position indicates a northerly course so that practically full potential is impressed on the turn potentiometer 20. During a 90° turn to the right, i. e., east, there is impressed a decreasing potential on the potentiometer 20 from which the slider contact 20' would derive a voltage proportional to the rate-of-turn. The potential decreases to zero when an easterly course is reached since there is no turning error on this course. The derived voltage is used to control in a manner presently described the potential impressed on the coil 15 so as temporarily to orient the compass card 1 in a new position representing the "northerly turning error" on a right turn. In this case the card rotates in the same direction as the simulated turn so that the reading may be "west" instead of "east." Similarly for example, it will be seen that during a right turn on a southerly course the polarity reversal at the potentiometer 20 can cause the compass card to indicate an error in the opposite direction. Acceleration errors which occur as a result of compass card tilt during level accelerating, climbing or diving are simulated in a realistic manner since as previously explained the maximum errors occur while flying an east-west course and zero error occurs while flying a north-south course.

The electronic valve means V and circuits associated therewith for operatively interconnecting the flight potentiometers and the disturbing coil 15 will now be described. A twin valve 80 is provided with a common cathode 81, a first control grid 82 and an associated anode 84, and a second control grid 83 and an associated anode 85. The anode or plate circuits are interconnected by the primary coil of a transformer $T_1$, the secondary of which is connected by the conductors 18 and 19 to the disturbing coil 15. The midpoint of the primary coil is connected by a conductor 86 to a suitable source of anode potential as indicated and also to the secondary coil of a supply transformer $T_2$, the primary of which is energized from a source of commercial A. C.

The modulator circuit here shown is of the type shown in my Patent 2,366,603 and constitutes a comparatively simple arrangement for adapting the A. C. torque balancing device 6 to a D. C. potentiometer system, although it should be understood that my invention is not limited to this arrangement. For example, the system may if desired be D. C. operated by the use of well known D. C. position transmitting and repeating apparatus to which a disturbing coil is added. In this case, a D. C. summing amplifier of well known type would be used in place of the modulator circuit to obtain a D. C. output.

The control grid 82 is connected by a conductor 87 to the air speed potentiometer contact 22' through a resistance $r_7$ and a capacitance $C_2$; and also by the conductors 87 and 88 to the climb potentiometer contact 21' through a resistance $r_4$ and a capacitance $C_1$. The capacitances $C_1$ and $C_2$ are each large as compared with the conductance of the grounded grid biasing resistance $r_{10}$.

The control grid 83 is directly connected to the rate-of-turn potentiometer contact 20' by conductor 89 which includes a resistance $r_1$. In view of the fact that the indicators 24 and 25 both represent velocity, it will be seen that the rate-of-change of velocity, namely acceleration or deceleration can be represented by the rate of potentiometer voltage change at the condensers $C_1$ and $C_2$. That is, the condensers function to differentiate rate-of-climb or air speed to give acceleration. Also, since the potentiometers 21 and 22 are both used for acceleration representation along the same compass course they are connected in parallel so as to function conjointly in the desired manner in respect to the control grid 82.

Operation

If now the aircraft is assumed to be in level flight at constant cruising speed, the control grids 82 and 83 will both be at the same potential, i. e., ground potential, and the anode currents at 84 and 85 will be equal and opposite in the respective halves of the primary winding of the transformer $T_1$. Accordingly there will be no induced voltage in the transformer secondary and hence no disturbing potential impressed on the coil 15. In the flight condition above referred to wherein the compass is unaffected, the rate-of-turn contact 20' connected to the grid 83 is at the central zero or grounded potentiometer position, and the conductors 87 and 88 connected to the grid 83 are also at ground potential. These last named conductors are isolated from the D. C. potentiometers by the condensers $C_1$ and $C_2$ except when acceleration or deceleration is indicated by movement of the respective slider contacts. In such cases the change of potentiometer voltage causes a transient current to flow through the respective condenser and the grid biasing resistance $r_{10}$ to ground producing a positive or negative charge depending upon whether acceleration or deceleration is indicated, at the condenser terminal to which the grid 82 is connected.

Assuming a right turn is made from a northerly course, the potentiometer contact 20' moves toward, say, the positive terminal of the potentiometer 20 so that the control grid 83 is biased so as to be more positive than the grid 82. Accordingly the anode current at 85 will be greater than that at 84 so as to cause unbalanced current to flow in the halves of the primary of the transformer $T_1$ and therefore to induce a potential in the secondary winding which is impressed on the disturbing coil 15 to cause rotation of the compass card in such direction, i. e. clockwise, as to indicate the well known "northerly turning error." When flying a southerly course the potentiometer voltage is reversed so that a right turn in this case causes the control grid 83 to become less positive than grid 82, thereby reversing the phase of the transformer output and causing counterclockwise rotation of the compass card so as to simulate the characteristic "leading" error.

Acceleration on a level easterly course for example causes the grid 82 to be biased in accordance with the transient voltage produced across the condenser $C_2$ by clockwise adjustment of the air speed contact 22'. In this case the potential of the grid 82 is depressed since the potentiometer voltage is decreasing so that the current through the anode 84 is less than that at the anode 85 with a result that the primary winding of the transformer $T_1$ is so energized that a potential is impressed on the disturbing coil 15 for rotating the compass card clockwise as viewed in Fig. 1 to simulate acceleration error on an easterly course. Acceleration on a westerly course produces a voltage of reverse polarity at condenser $C_2$, since the potentiometer polarity is now reversed, with a result that the grid 82 is made more positive than the grid 83 thus causing phase reversal of the disturbing coil voltage and counterclockwise rotation of the compass card to simulate acceleration error on a westerly course. It will be apparent from the foregoing description that the deceleration errors will be opposite to the acceleration errors on the same course for simulating those encountered in actual flight.

In certain cases acceleration errors tend to counterbalance each other. For example in the case of a rapid and steep climb in the direction of an inside loop, air speed acceleration tends to tilt the compass card in one direction and the centrifugal force due to angular velocity tends to tilt the card in the opposite direction. In general, this counterbalancing of tilting forces is simulated by my invention since it will be noted that potentiometers 21 and 22 representing rate-of-climb and air speed respectively are connected in parallel so that the rates of voltage change at the condensers $C_1$ and $C_2$ are substantially in opposition in the case of simulation of the beginning of an inside loop. Accordingly the grid 82 will be substantially unaffected, or at least to an immaterial extent. In the case of an accelerating dive the movement of the dive contact 21' is reversed so that the voltages at $C_1$ and $C_2$ have the same instantaneous polarity and a resultant greater voltage appearing across the grid resistor $r_{10}$ is impressed on the grid 82.

It will be understood that I have stressed the simulation of what I consider to be the more important compass errors in practice and that the above described potentiometer circuits may be modified in a manner well known in the art for varying the extent of simulated error, and in special circumstances reversing if desired the direction of the simulated error.

The potential impressed across the terminals 31 and 32 of the azimuth potentiometer 26 may be varied in accordance with simulated change in latitude by means of a sine-cosine potentiometer 39 having its terminals 40 and 41 connected to a source of D. C. potential as indicated. The other quadrant terminals 44 and 45 of the potentiometer 39 are grounded to represent the latitude of the Equator. The potentiometer slider contacts 46 and 47 are located 180° apart in fixed relation to each other and are positioned with respect to the potentiometer winding by any suitable means, such as a manually controlled knob 48. The contacts 46 and 47 are connected to slip rings 46a and 47a movable as a unit with the adjusting knob 48 and engaged by brushes 46b and 47b which are in turn connected to the azimuth potentiometer conductors 33 and 34 respectively. It will therefore be seen that the potential impressed on the azimuth potentiometer decreases, for example, as a flight in the Northern Hemisphere approaches the Equator, becomes zero at the Equator and then reverses in polarity after passing the Equator to simulate turning errors that occur in the Southern Hemisphere. The sine-cosine potentiometer 39 can therefore be considered a latitude corrector for introducing in a realistic manner the turning errors encountered in both Northern and Southern Hemisphere flying. It will be obvious of course as above indicated that the latitude corrector can be replaced by a constant source of D. C. potential of proper polarity in cases where the simulated flight maneuvers are limited to a narrow range of latitude.

A practical form of the simulated compass element and electro-responsive device 6 is shown by Figs. 2, 3 and 4.

Fig. 2 shows the simulated compass apparatus as it appears on the front of the instrument panel. As in actual practice, the apparatus comprises a compass element or needle 50 and a separately movable course guiding member 51 that can be set on any course bearing on the azimuth scale 52 by means of an adjusting knob 53.

Referring more particularly to Figs. 3 and 4, the apparatus is housed in a cylindrical casing 54 that is secured in fixed relation to the instrument panel. The casing 54 is composed of two cylindrical sections 55 and 56 joined by screws 57. The section 55 encloses the synchronous rotary transformer 6 previously referred to and is provided with a peripheral flange portion 58 forming the circular dial recess for the compass element, and also providing means for attaching the casing to the instrument panel. The section 56 is provided with a reduced portion 59 forming a bearing support for the azimuth shaft 2. The shaft 2, which is rotatably mounted in the ball bearing 60 is connected directly to the casing of the device 6 by means of a sleeve 61 which is pinned to the shaft at 62 and which has a flange 61' secured at 63 to a cylindrical housing 64 for the device 6. The rotatable element (not shown) of the device 6 is connected to the shaft 8 to which the compass element 50 is connected for rotation therewith, as best shown in Fig. 4. The housing 64 is provided at the compass end with a reduced bearing portion 65 that is rotatably supported in the end plate 66 by the ball bearing 67. Accordingly it will be seen that rotation of the shaft 2 in accordance with change in compass heading of the flight causes a corresponding rotation of the housing 64 of the device 6 which in turn causes orientation of the compass needle shaft 8 in accordance with the energization of the coil 15, Fig. 1.

For the purpose of providing suitable electrical connections between the fixed and moving parts, a slip ring assembly 68 is mounted on the sleeve 61 and coacting brushes 69 are mounted about the periphery thereof on insulating members 70 secured in fixed relation to the section 56 of the main casing. This slip ring assembly corresponds to that diagrammatically shown on the device 6 of Fig. 1. Electric connections can be made with the brushes 69 through the casing by means of the detachable wall sections 71, and the slip rings are suitably connected to the electro-responsive device 6 by means of conductors 72. In Fig. 3, the complete assembly corresponding in function to the slip-ring assembly of Fig. 1 comprises the slip rings 68, brush contacts 69 and conductors 72 that are suitably connected to the electrical coils (not shown) within the device 6.

The course guide 51 is positioned by the knob 53 through the gears 73, 74 and 75, Figs. 2 and 4.

The gear 75 is rotatably mounted on a centrally positioned hub-like extension 76 secured to the fixed diaphragm 77 and is provided with an annular boss 78 to which the course guide 51 is secured.

It should be understood that this invention is not limited to specific details of construction and arrangement thereof herein illustrated, and that changes and modifications may occur to one skilled in the art without departing from the spirit of the invention.

I claim:

1. In flight training apparatus having means for simulating flight maneuvers of an aircraft, direction indicating means responsive to said maneuvers comprising a compass element for representing change in compass heading of the simulated flight, and electro-responsive means controlled in accordance with simulated flight conditions for applying a displacing force to said compass element, said electro-responsive means including voltage deriving means controlled according to said compass heading for deriving voltages of varying sense for determining the direction of said displacing force, a plurality of variable electrical means adjustable respectively according to simulated rate of turn and airspeed energized by respective of said voltages, and means jointly responsive to said variable electrical means and operatively related to said compass element for producing a resultant displacing force whereby both turning and acceleration errors such as would occur along all compass courses in actual flight are simulated.

2. In flight training apparatus for simulating flight maneuvers, a direction indicating system responsive to said maneuvers comprising a compass element for representing change in compass heading of the flight, means for producing a potential, means for modifying said potential, one of said means being responsive to a flight condition and the other of said means being controlled in accordance with the flight heading, an electro-responsive means controlled by said modified potential for modifying the movement of said compass element so as to simulate turning and acceleration errors such as would occur along all compass courses in actual flight.

3. In flight training apparatus having means for simulating flight maneuvers, direction indicating means comprising a compass element responsive to change in compass heading of the simulated flight, and means for modifying the movement of said element so as to simulate turning and acceleration errors such as would occur on all compass courses in actual flight, said modifying means comprising means for deriving a plurality of voltages in accordance with the flight heading with respect to the north reference position, means separately controlled according to a plurality of simulated flight conditions including rate of turn and air speed for modifying said voltages respectively, and an electro-responsive device operatively connected to said element and jointly responsive to said modified voltages for varying the position of said element.

4. Compass apparatus for ground trainers having means for simulating flight maneuvers comprising a compass element responsive to change in compass heading of the flight, and electro-responsive means controlled according to a plurality of flight conditions respectively for modifying the movement of said element for representing turning error, said electro-responsive means comprising relatively movable coil structures, a source of potential, means for modifying said potential in accordance with rate of turn and also in accordance with flight heading and means for energizing one of said coil structures according to said modified potential so that said element lags on a turn from a northerly course and leads on a turn from a southerly course when representing flight in the Northern Hemisphere.

5. Compass apparatus for a grounded flight trainer having means for simulating flight maneuvers comprising a simulated compass element responsive to change in compass heading of the simulated flight, means for deriving a voltage depending in magnitude on the simulated compass heading with respect to the north reference position, means for modifying said voltage in accordance with simulated rate of turn, electro-responsive means controlled in accordance with the modified voltage for affecting the movement of said element so as to represent turning error so that said element lags on a turn from a northerly course, leads on a turn from a southerly course and is not affected on easterly and westerly courses when representing flight in the Northern Hemisphere.

6. Compass apparatus for a grounded flight trainer having means for simulating flight maneuvers, comprising a compass element responsive to change in compass heading of the simulated flight, potentiometer means for deriving a pair of voltages depending in magnitude and sense on the compass heading, potentiometer means controlled in accordance with simulated aircraft velocity and rate of turn for modifying said derived voltages and electro-responsive torque balancing means responsive to said modified voltages for affecting the movement of said element so as to simulate turning and acceleration errors such as would occur on all compass courses in actual flight.

7. Compass apparatus for ground trainers having means for simulating flight maneuvers comprising a compass element responsive to change in compass heading of the simulated flight, means for applying a force to said element to modify its movement so as to simulate turning errors such as would occur in actual flight, and means for determining the magnitude and direction of said force comprising a first means responsive to simulated change in latitude, a second means responsive to change in compass heading of the flight for modifying the operation of said first means and a third means responsive to simulated rate of turn for modifying the operation of both said first and second means.

8. Compass apparatus for a grounded flight trainer having means for simulating flight maneuvers, comprising a compass element responsive to change in compass heading of the simulated flight, a first means for deriving potential depending in sense and magnitude on simulated latitude, a second means for modifying said potential in accordance with compass heading, a plurality of means for further modifying said potential in accordance with simulated rate of turn and aircraft velocity, and electro-responsive means controlled by the modified potential for affecting the movement of said element so as to simulate turning and acceleration errors such as would occur on all compass courses in actual flight in either hemisphere.

9. Compass apparatus for ground flight trainers having means responsive to changes in compass heading of the simulated flight, a compass element, electro-magnetic means including a pair of coils relatively movable with respect to each other, said coils being arranged magnetically to couple said first-named means to said compass element for positioning said element, and variable electrical means responsive to certain flight conditions controlling energization of another coil arranged for magnetic coupling with one of the aforesaid coils for causing said compass element to be further positioned so as to simulate compass error.

10. In flight training apparatus having means for simulating flight conditions, a compass element operable in accordance with said conditions for representing the compass heading of the flight, electro-magnetic means including a disturbing coil for affecting said compass element so as to move it with respect to the correct flight heading, means including a differentiating condenser circuit operable by said simulating means for deriving a potential representing acceleration, and means for energizing said disturbing coil in accordance with said potential for temporarily affecting said compass element so as to simulate magnetic compass acceleration error.

11. In flight training apparatus having means for simulating flight conditions, a compass element, electro-magnetic means comprising relatively movable coil structures for magnetically coupling said compass element to means simulating the heading of the simulated flight, a plurality of variable electrical means operable respectively according to a plurality of simulated flight conditions including flight heading, rates of turn and climb, and air speed, for deriving voltages representing rate of turn and acceleration respectively and means for energizing one of said coil structures in accordance with said derived voltages for affecting said compass element so as to simulate magnetic compass error.

12. In flight training apparatus having means for simulating flight conditions, a compass element operable in accordance with the simulated flight compass heading, electro-magnetic means including a disturbing coil for affecting said compass element so as to move it with respect to the correct compass heading, a plurality of means operable respectively according to a plurality of simulated flight conditions including flight heading, rates of turn and climb, and air speed for deriving voltages representing rate of turn and acceleration respectively, and electronic means including twin-tube structure having one grid energized by the rate of turn voltage and another grid energized by the acceleration voltage, the output of said electronic means energizing said coil for temporarily affecting said compass element so as to simulate magnetic compass error encountered on different compass courses in actual flight maneuvers.

13. In flight training apparatus having means for simulating flight maneuvers including means responsive to change in compass heading of the simulated flight, direction indicating means comprising a compass element, and coupling means operatively connecting said compass element to said heading means, additional means related to said coupling means for modifying the heading movement of said element, means also operable according to compass heading for deriving a plurality of control quantities variable in magnitude and sense with said heading, means operable according to simulated rate of turn and aircraft velocity for modifying said control quantities respectively, and means connecting said control quantity modifying means to said coupling related means for affecting the movement of said compass element in simulation of turning and acceleration error for all compass courses.

14. In flight training apparatus having means for simulating flight maneuvers including means responsive to change in compass heading of the simulated flight, direction indicating means comprising a compass element and electro-magnetic coupling means operatively connecting said compass element to said heading means, a coil magnetically related to said coupling means for modifying the heading movement of said element, electrical means also operable according to compass heading for deriving a pair of control voltages variable in magnitude and sense with said heading, electrical means operable according to simulated rate of turn and aircraft velocity for modifying said control voltages respectively, and means connecting said modifying means so as to energize said coil for affecting the movement of said compass element in simulation of turning and acceleration error for all compass courses.

RICHARD C. DEHMEL.

REFERENCES CITED

The following references are of record in the file of this patent:

UNITED STATES PATENTS

| Number | Name | Date |
|---|---|---|
| 2,366,603 | Dehmel | Jan. 2, 1945 |
| 2,445,673 | Kail | July 20, 1948 |
| 2,450,240 | Kail | Sept. 28, 1948 |